United States Patent [19]

Heitmann et al.

[11] 4,210,938
[45] Jul. 1, 1980

[54] METHOD AND SYSTEM FOR SPEED-MODIFIED REPRODUCTION OF VIDEO SIGNALS STORED ON VIDEO RECORDING TAPE

[75] Inventors: Jürgen Heitmann, Seeheim; Rudolf Wilhelm, Klein-Gerau, both of Fed. Rep. of Germany

[73] Assignee: Robert Bosch GmbH, Stuttgart, Fed. Rep. of Germany

[21] Appl. No.: 908,930

[22] Filed: May 24, 1978

[30] Foreign Application Priority Data

Jun. 4, 1977 [DE] Fed. Rep. of Germany ....... 2725365

[51] Int. Cl.² .................. G11B 5/78; G11B 27/10; H04N 5/78
[52] U.S. Cl. ........................ 360/10; 360/24
[58] Field of Search ............ 360/10, 32, 36, 24; 358/4

[56] References Cited

U.S. PATENT DOCUMENTS

| | | | |
|---|---|---|---|
| 3,535,440 | 10/1970 | Watanabe et al. | 360/70 |
| 3,921,132 | 11/1975 | Baldwin | 360/32 |
| 4,133,009 | 1/1979 | Kittler et al. | 360/36 |

Primary Examiner—Stuart N. Recker
Attorney, Agent, or Firm—Frishauf, Holtz, Goodman & Woodward

[57] ABSTRACT

A head wheel is rotated at a predetermined, essentially constant speed within a tape cylinder over which a tape is guided in a spiral path, on which video signal tracks are recorded in inclined track portions. The instantaneous position of the head wheel is determined, for example by a tacho generator applying signals to a counter, phase-synchronized by the outputs from the head wheel tacho generator. The instantaneous position of the tape is determined, for example from sensing the cross modulation of signals derived from the head as the head crosses from one track portion to another, or by sensing the phase jump of the pulse sequence of the horizontal synchronization signals; the two position signals are combined in a logic stage so that a line address can be derived of a signal transduced at any one instant by said head from an incremental area of the tape, the signal being associated with the line address for storage, for example in a memory for subsequent re-recording or reproduction at a time relation (slow motion or fast motion) differing from the original recording speed.

9 Claims, 8 Drawing Figures

METHOD AND SYSTEM FOR SPEED-MODIFIED REPRODUCTION OF VIDEO SIGNALS STORED ON VIDEO RECORDING TAPE

Reference to related application U.S. Ser. No. 833,993, filed Sept. 16, 1977, FOERSTER, new U.S. Pat. No. 4,139,867 assigned to the assignee of the present application.

The present invention relates to a method and a system to reproduce a video signal stored on video tape, and more particularly to a method and system in which the reproduction speed differs from the storage speed, so that slow-motion and past motion effects can be obtained. Specifically, the present invention relates to an improvement of the method and system disclosed in copending application Ser. No. 833,993, filed Sept. 16, 1977, FOERSTER, new U.S. Pat. No. 4,139,867 assigned to the assignee of the present invention, the disclosure of which is hereby incorporated by reference.

BACKGROUND AND PRIOR ART

The referenced application, and corresponding German Patent Publication, describes a method and system to reproduce video signals recorded on video recording tape in the form of slanting tracks. This system permits bidirectional change in reproduction time with respect to recording time, in effect providing for slow-motion or accelerated or fast-motion reproduction of events recorded at a standard recording speed. The video image of a complete frame is recorded in a plurality of adjacent tracks; usually, the frames are interlaced so that a half-image is recorded on adjacent tracks. The recording speed is that usually or normally used, the tape being passed in a spiral path over a cylindrical body in which a recording head on a rotating head wheel is rotating. Upon psssing the tape over the cylindrical body, and rotating the recording head, the plurality of adjacent tracks will be formed extending at an angle with respect to the longitudinal axis of the magnetic tape, thereby storing signal information representative of the video image. The speed of movement of the head wheel during recording and reproduction is about the same. It is the transport speed of the magnetic tape which is changed. Since the magnetic tape moves at a speed different from that of the recording speed, the magnetic heads will sense and transduce magnetically recorded signals into electrical signals which do not at all times correspond to the tracks on the tape, as recorded. The magnetic heads will scan the tape at an angle which is different from the angle of inclination of the recorded tracks. This difference angle may cause the heads to scan at an angle which crosses adjacent tracks, depending on the speed and direction of the difference in transport speed of the tape. To reconstruct a complete television image, it is necessary to store only those signals which occur during the time portions, during scanning, which satisfy the signal read-out requirements, the stored signals then being read out in accordance with television reproduction standards.

In practical use of the system described in the cross-referenced application, and patent it has been found that usual criteria for the recognition of signals to be stored are not sufficient for recognition of the signals themselves; these criteria, are, primarily, the amplitude of the signal, or the amplitude of the carrier frequency if the signals are recorded on a carrier. Due to the narrow width of the gap beteen adjacent tracks on the magnetic tape, it is difficult to distinguish between signals of adjacent tracks since the amplitude of the reproduced signals change upon transition from one track to the next by only a slight amount. It is thus very difficult, and sometimes impossible, to reliably detect transition from one track to the other by sensing drop in signal level. Additionally, addressing each one of the lines already in recording requires substantial circuitry in the recording system.

THE INVENTION

It is an object to improve the system and method described in the aforementioned referenced application, and German Disclosure Document, by improving the reliability of recognition when the head wheel leaves a track, the signals of which are being picked up, and goes to an adjacent track; to facilitate addressing of information read into a buffer memory and, generally, to render the system more reliable to obtain slow-motion and fast-motion effects by varying tape speed related to head wheel speed.

Briefly, the head wheel carrying recording heads and transducing magnetically recorded signals from the tape is rotated at a predetermined constant speed, regardless of tape speed over the recording cylinder. The instantaneous position of the head wheel is determined by deriving a head wheel position signal which defines an address of the head wheel position, that is, its angular position with respect to a reference, as the head wheel rotates. The instantaneous position of an incremental area of the tape on the cylinder is determined and a tape position signal is obtained which defines an address of the position of the tape, or a tape track, as it moves over the cylinder. The head wheel position and the tape position addresses are combined and, from the combination, a line address of the signal transduced by the head wheel from an incremental area of the tape is determined. A buffer memory is used to store the signal under the specific line address. By means of these addresses, the signal contents of incremental areas of any one line are then associated, and this signal content is stored in a memory from which it can be read out for subsequent reproduction, or further recording.

In accordance with a feature of the invention, the line address is obtained by applying the horizontal synchronization signals to a line counter which is phase-synchronized with the head wheel position, by the head wheel position signal. The line counter is reset after it has counted a predetermined number of horizontal synchronization signals, corresponding to a track portion. The carry output of the line counter is algebraically added to a pulse train derived upon transition from one track to another track to obtain a modified count signal, and the modified count signal is entered into a bidirectional counter counting to a number n which is defined as the number of track portions corresponding to at least one half-frame of a complete television image. The bidirectional counter is synchronized by synchronizing pulses derived from the tape, and the output of the bidirectional counter, after code conversion, is added to the line synchronization signals derived from the line counter. Transition between tracks is, preferably, sensed by sensing cross modulation resulting upon such transition or by the phase jump in the pulse sequence of the horizontal synchronization signal, thereby reliably distinguishing between signals of adjacent tracks.

The method and system has the advantage that portions of signals and signal tracks can be reliably distinguished and properly stored. Further, the signal portions can be stored in a buffer or intermediate memory at proper addresses without pre-addressing the signals, so that they can be read subsequently in a predetermined standard TV scanning arrangement.

Drawings, explaining the invention and illustrating a preferred example, wherein.

Figure 1:
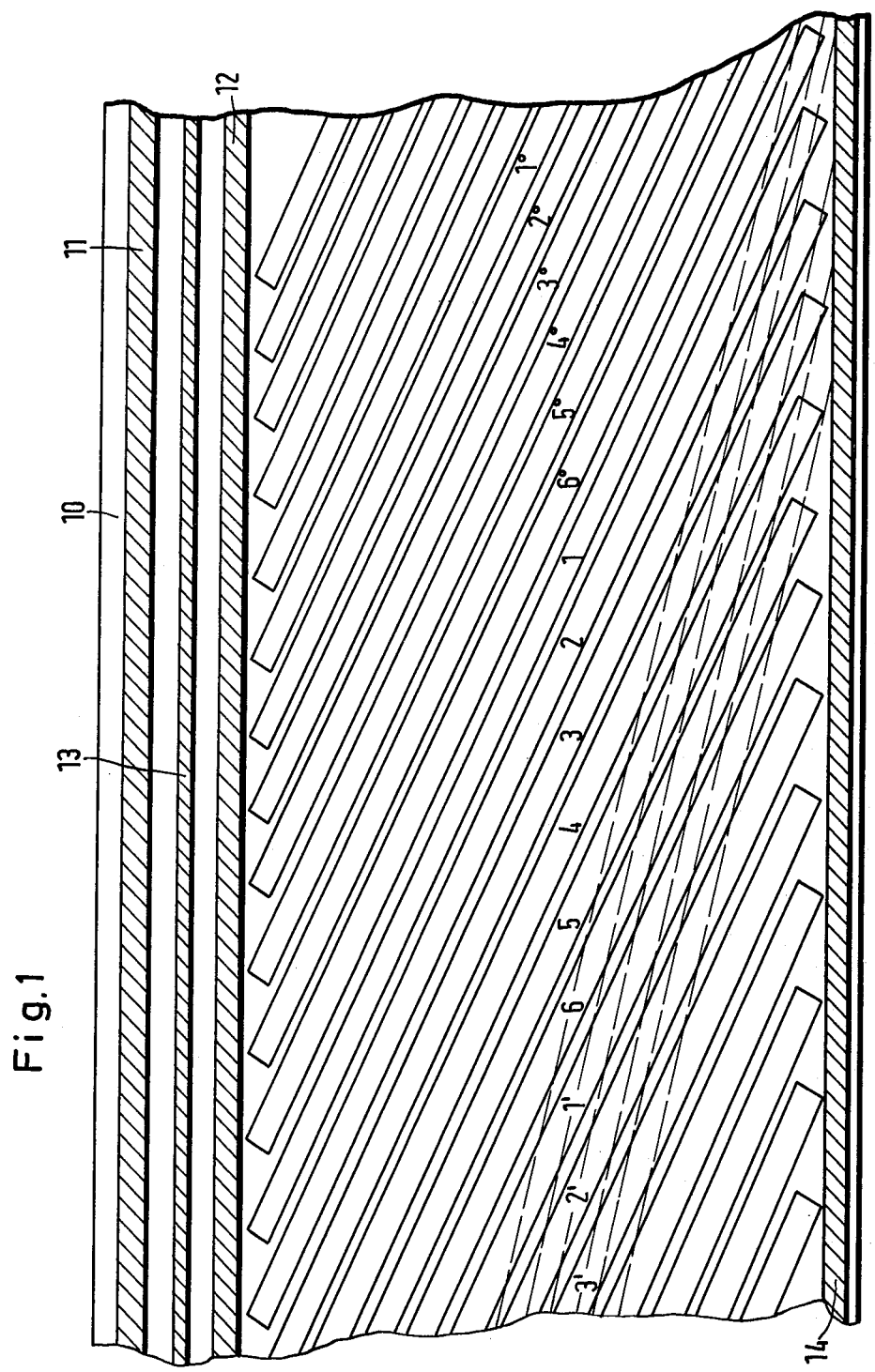
FIG. 1 is a schematic representation of signals recorded in inclined tracks on a video recording tape.

A magnetic tape 10 (FIG. 1) carries video information in form of a plurality of inclined tracks 1°, 2°, 3°, 4°, 5°, 1, 2, 3, ... 2′, 3′ ... etc. In one operating example, each one of the track portions stored the content of somewhat over 52 lines of a TV image. The content of six tracks then will correspond to a field of a video image consisting of 312.5 lines if constituted in accordance with European standards of 625 lines. About five tracks will form a field on the 525-line standard, ten tracks will provide a complete, interlacd frame of 525 lines; twelve tracks will provide the complete frame in accordance with European standards of 625 lines. The tape carries not only the inclined tracks for video recording but, additionally, has room for longitudinal tracks on which additional information is recorded.

Figure 2:
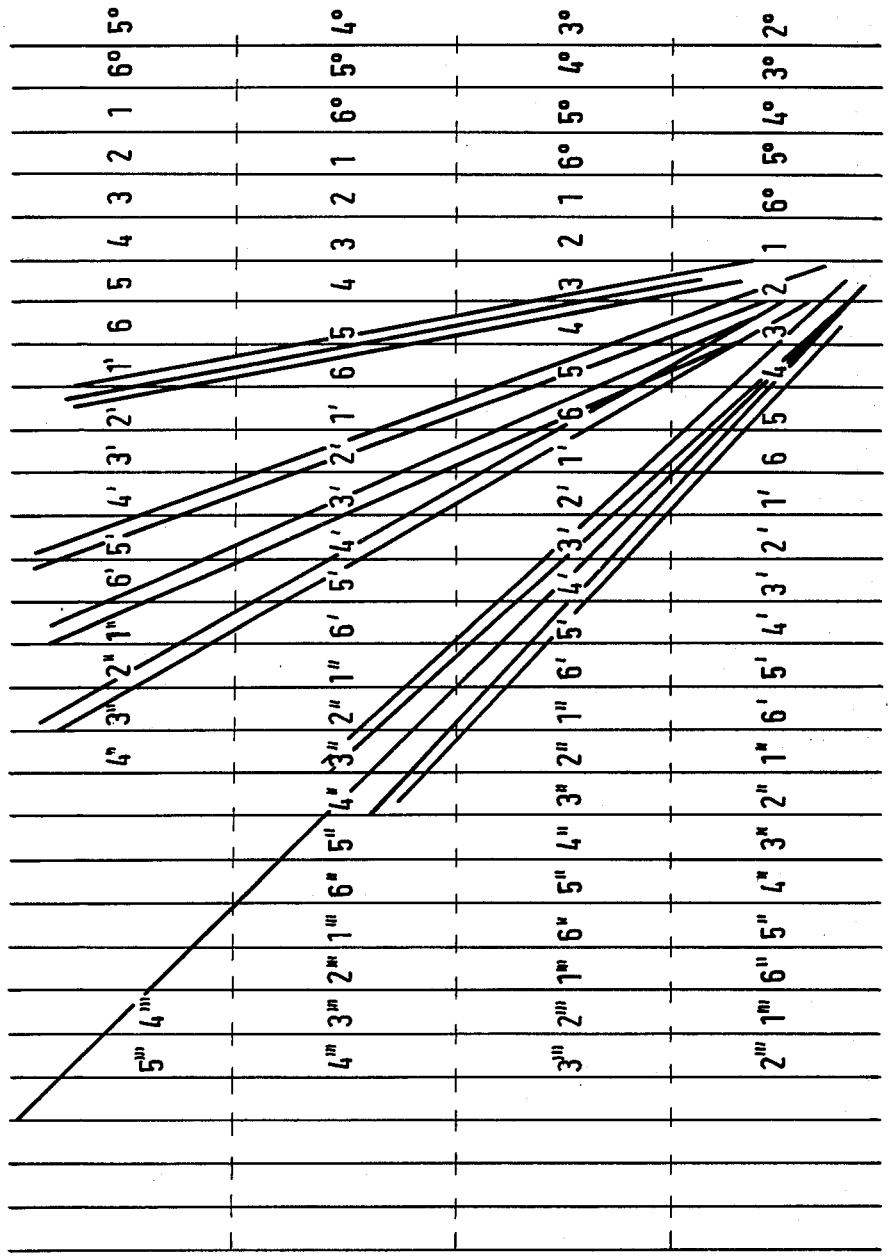
FIG. 2 is a schematic arrangement of track scanning in accordance with the invention.

Longitudinal tracks 11 and 12 on the tape 10 are used for stereo sound. Track 13 provides video synchronizing information; if the tape is used in accordance with the PAL system, 4 V pulses are recorded on the track 13 to characterize the proper phasing in accordance with the PAL standard. An additional track 14 is provided which can be used for auxiliary signals, for example direction for cutting, for the producer of the material being recorded, or it may contain additional sound channels, for example in a language other than the audio signals on tracks 11 and 12. FIG. 2 shows tracks 1 to 6 aligned to represent a video field. Track 6 is followed by track 1′ of the next field, followed thereafter by tracks 2′, 3′. The vertical lines correspond to scanning at standard speed, in which, sequentially, the tracks are completely scanned in their full length, and completely reproduced. Next to the vertical lines, further parallel ordinates are located, with the same distances, which also have the track portions numbered, shifted, however, from right to left by one unit, respectively. At the left of track 1 is track 2; at the left of track 1′ is track 2′, followed by track 3′, etc. At the right of the output line, or ordinate, the numbering decreases with increasing distance; thus, next to track 1 is track 6°, next to it 5°, next to it 4°, below it 3°, etc. Transport speed "zero" of the magnetic tape corresponds to that straight line in which subsequent track portions of the same numbering are cut always at the same position.

If the magnetic head operates at a whole number multiple of normal, or recording speed, for example twice the recording speed, when the magnetic head will scan for example the beginning of track 1; upon the next subsequent revolution it will scan over the beginning of track 3, thereafter over the beginning of track 5, etc. In the diagram, the scanning line starts at the beginning of track 1, shortly after the beginning of track 3, etc. From the entire information contained in tracks 1 to 6, only those portions are read out which correspond to the beginning of any one track. The additional information necessary to constitute a complete field and corresponding to the remaining length of the track thus is lost, and a complete TV image is not obtained.

The diagram however additionally shows that, outside of the n x normal speed, or 1/n x normal speed—in which n is a positive or negative whole number—there are tape speeds in which a limited number of revolutions of the head wheel of any tape track 1, 1′, 1″, etc. and 2, 2′, 2″, etc. can be scanned at least sufficiently frequently so that the necessary lines for any one field of corresponding numbering are read out, without interference, at least once. A constant relationship will obtain between the number of the useful lines as the head scans over a track and the portion of the entire image of the respective track; this relationship is independent of the selected tape speed.

It has been found desirable to so select the reproduction tape speed that the image is reconstituted continuously of sequential, reliably and unambiguously read groups of lines. For example, lines 1 to 4 can be read from the track 1, lines 5 to 8 from track 1′ and representing a portion of the information content of the next subsequent field, and lines 9 to 12 from the track portion 1″. A so constituted image then provides the least flicker or edge discontinuities or jumps upon reproduction, particularly if the reproduced scene includes motion. Of course, a suitable image can also be constituted of groups of lines with decreasing numbering, for example lines 52 to 49 from track 1, lines 48 to 45 from track 1′, lines 45 to 42 from track 1″, and so on. This, however, requires a reproduction speed which differs from that in the first example, and thus results in a different speed factor.

To reconstitute a continues complete half-image from various groups of lines, which are associated with different previous fields, it is necessary that two characteristics are recognized:

(1) Which lines and, how many lines, respectively, of a group of lines are unambiguously read; and (2) what address is associated with these lines? The address characterizes the geometric position of a line within the image.

The characteristic (1) above requires reading of lines unambiguously and without interference or disturbance. Disturbances are characterized by sensing, for example, cross modulation in a demodulated signal which occurs upon transition of the magnetic head from one track to an adjacent, neighboring track. It has been found that the level of such disturbance modulation is substantially higher than the level of the signal useful for reproduction. The level of the cross modulation signal will rise positively above the level of the video signals, as well as in negative direction below the level of the synchronizing signal. The signal thus can be clamped, the signal portions which are below the synchronizing level separately sensed and utilized to recognize that (a) the track has been left by the head wheel; and
(b) the lines having the specific signal portions are disturbed.

This method permits a much more reliable differentiation between perfect lines and disturbed lines than when the collapse of carrier frequency upon transition from one track to the next is used as the characteristic for such transitions.

In case of a scanning standard as shown in sketch D the transition from one track to the next can also be sensed by sensing the phase jump of the horizontal synchronizing signal. This phase jump occurs during scanning of a track with a predetermined scanning speed, sequentially, at a fixed frequency or sequence. Thus, upon transition from one track to the next, the phase jump will occur.

Cross modulation can be reliably sensed by synchronizing a flywheel oscillator, which permits counting of perfect lines or, respectively, scanning of disturbed lines. Such an arrangement ensures an average undisturbed and thus good recording of an image or scene even if, by chance, and occasionally, a line which is already disturbed has been recognized as "good" or, inversely, a "good" and perfect line was not used in reconstituting the image.

Groups of lines which are perfect and those which are affected by cross modulation follow each other with the frequency of jumps over the tracks. This frequency changes with transport speed upon reproduction and thus with the reproduction time factor. The time constant of the flywheel circuit then must be suitably switched over or matched to the reproduction speed.

The second characteristic above referred to, namely the determination of the addresses, is determined by utilizing output pulses derived from a tacho pulse generator coupled to the head wheel. The address of an instantaneous position of the head wheel is obtained by sensing pulses from a tacho pulse generator, rotating with the head wheel. The tacho pulse generator provides a suitable pulse once for each revolution of the head wheel. A counter synchronized with the head wheel pulses counting, for example, with the frequency of the horizontal synch signals then can determine an address corresponding to head wheel position. In practical effect, the counter will count lines. Thus, in a practical embodiment, a counter counting from 1–52 has been used. If the head wheel speed of revolution does not change upon changed reproduction speed, then the count state of the counter will be representative of the instantaneous angular position of the head wheel and thus provide a number representative of an address of the then instantaneously sensed incremental image content. If the counter receives a pulse signal which is coupled to the head wheel rotation frequency, instead of the horizontal sync signal, then the head wheel rotation speed also can be changed.

The counting frequency, preferably, is derived from a quartz-controlled clock generator having a clock frequency which is a multiple of the line frequency. This permits more accurate addressing, particularly since one track will not always record an entire whole number of lines. In general, a frequency is needed which permits associating any angular position of the head wheel with sufficient accuracy with respect to the transverse dimension of the magnetic tape to derive an address, thus characterizing the instantaneous geometrical position of the head wheel with respect to the transverse position of the tape. This address then can be used to determine the line address within a track portion. As an example, if 52 lines are recorded in any one track portion, and correspond to a count address of, for example, 10, then this number 10 corresponds either to the tenth line or to the 52+10=62nd line, or to the 52+52+10=114th line, etc. The frequency with which cross modulation occurs can be used to determine the proper or correct track portion. As above described, cross modulation occurs each time that the head wheel changes from scanning one track to scanning an adjacent track.

A further criterion for transition from one track to the next is the switching pulse which occurs after a half-revolution, that is, 180° rotation of the head wheel, and used to switch from one transducing head to the next—assuming two heads mounted diametrically opposite a head wheel. This head wheel switching pulse, occurring after each half-revolution, is first obtained from the head wheel; the next switching pulse after the counter has counted to the appropriate line number, for example to line number 52, corresponding to the end of a track.

The effective speed with which the various tracks pass the scanning arrangement is determined for transport speeds greater than normal from the sum of the change-over switching pulses, corresponding to 180° head switching and the cross modulations, for any unit of time. For transport speeds which are less than the normal speed, including reverse running, a track transition will occur in positive direction upon occurrence of the 180° head wheel switching pulse, whereas a cross modulation pulse characterizes a track transition in negative direction.

Figure 3:
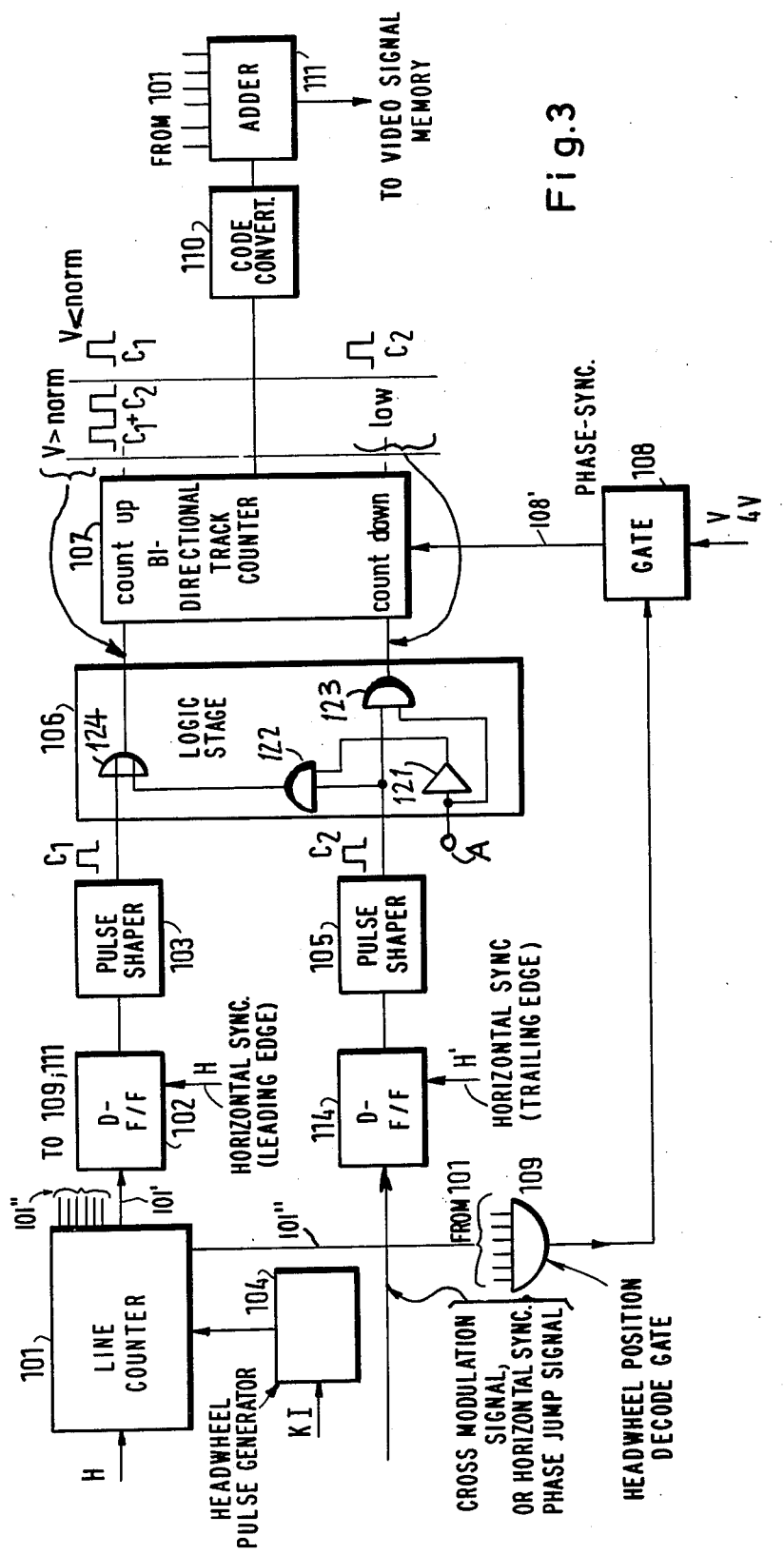
FIG. 3 is a highly schematic circuit arrangement of the system, which carries out the method of the invention.

The system will be explained in connection with FIG. 3: A line counter 101 counts 52 lines of a track. It is phase-synchronized by head wheel pulses derived from head wheel pulse generator 104. The input to head wheel pulse generator 104 is derived from the head wheel tacho generator, schematically indicated by arrow KI. Line counter 101 provides two types of output signals: After each full count, the counter provides an overflow or end-of-count pulse at line 101'; additionally, as the counter counts, output pulses are derived on separate output lines 101". The overflow or reset output pulse on line 101' is applied to a D-flip-flop (FF) 102. It is triggered with the leading edge derived from the horizontal sync signal appearing at terminal H. This signal, also, triggers the line counter 101. The output from D-Ff 102 is applied to a pulse shaper 103 which provides an output pulse of desired form $C_1$.

A second D-FF 114 is triggered by the trailing edge of the horizontal sync. It has the cross modulation signal applied thereto, derived from a reading circuit of the tape head, and after the cross modulation signal has passed through a flywheel inertia circuit. A flywheel inertia circuit may, for example, include a phase comparator having an output connected to an oscillator, the output of which is used as a comparison input to the phase comparator - see the referenced application and German Disclosure Document. Using the trailing edge of the horizontal sync signal, applied at terminal H' to the D-FF 114 as a triggering signal, has the advantage that, upon combining the signals, after having passed through pulse shapers 103, 105 from the D-FFs 102, 114, the two signals can be reliably distinguished for counting even if they are essentially coincident in time. The output pulse shaper 105 provides an output signal $C_2$, suitably shaped and of the selected pulse wave shape, for application to logic stage 106, and combination in the logic stage with the signal $C_1$, derived from pulse shaper 103. The output of the logic stage 106 is connected to a bidirectional track counter 107 having an up-count and a down-count input. The bidirectional counter 107 receives, at its respective inputs, a signal sequence corresponding to continuous crossing of tracks at any one speed of the tape.

The counter 107 must count correctly video images or PAL trains; a V pulse or a 4 V pulse provides for phase synchronization, derived from output 108' of a phase synchronization gate 108. Gate 108 is rendered active by the output from gate 109 which receives, as its input, the count output states of line counter 101, derived from line 101''. These output count numbers on line 101'' characterize the angle of the head wheel at any particular angular position, as determined by the logic of gate 109. Thus, the angle of the head wheel when a V pulse is to be recorded can be accurately determined. The 4 V pulse applied to the gate 108 is derived from the control track 13 of tape 10, on which the respective pulses are recorded. A V-phase synchronizing pulse can also be derived from the video signal. The track counter 107 thus will count track portions, commencing with the first track of the first field or frame.

The output from the track counter 107 is applied to a code converter 110, and then to the adder input of an adder 111. The adder 111 has a second input connected to the lines 101'' from the line counter. The output of the adder 111 which, itself, forms a counter, thus will be representative at effectively any time, and at practically any desired tape speed, to the line address of the signal which can then be applied to a subsequently connected video memory.

If the video signal is highly distorted or disturbed, for example due to cross modulation disturbances, storage in the video memory is interrupted. The control pulse therefor is derived from the frequency with which the cross modulation occurs. An optimum recognition circuit is preferably provided, and adjusted to operate based on a compromise between an image which is as undistorted as possible, particularly unaffected by moiree disturbance, and rapid regeneration of the image being produced, for recording, or subsequent reproduction.

A cross modulation detector, suitable to provide a signal to D-FF 114 is described below in connection with sketch "B".

A phase jump detector suitable to provide a signal to D-FF 114 is described below in connection with sketch "C".

The input A of logic circuit 106 is connected to a speed selector switch. The arrangement is so made that, upon selection of a tape speed greater than normal speed, the signal at terminal A is "low". If the speed selector switch, however, is in a position which corresponds to a tape speed smaller than normal (including reverse) then the output of the selector switch should provide a signal to the input A of the logic stage 106 of "high".

The logic circuit 106 logically interconnects the signals C 1 and C 2 which appear at the two signal inputs. The logic stage 106, to this end, has an inverter stage 121, the input of which is connected to the control input A and the output to an AND gate 122. The second input A of the AND gate 122 is connected to the output of the pulse shaper 105. Simultaneously, the input of an AND gate 123 is connected to the output of the pulse shaper 105 over the lower signal input of the logic stage 106. The second input of the AND gate 123 is connected to the control input A. The output of the AND gate 123 is connected to the countdown input of the bidirectional counter 107. An OR-gate 124 in the logic stage 106 has two inputs, one of which is connected to the upper signal input of the logic stage 106 and to the pulse shaper 103, the other input being connected to the output of the AND gate 122.

The operation of the described arrangement is as follows: when the speed selector switch of the magnetic tape apparatus is in a position which corresponds to a speed greater than standard speed, a Low signal is at the control input A of the logic stage 106. It is inverted in the inverter stage 120 and applied to the AND gate 122. The pulses C2 appearing at the output of the pulse shaper 105 correspond to a transition from one track to the other due to detection of the phase jump, or the resulting cross modulation. Each pulse C2 thus is applied to the AND gate 122 which provides an output signal upon occurrence of the pulses C2. This is applied to the OR gate 124, the second input of which receives the pulses C1 corresponding to the head engagement pulses. The OR-gate 124 thus will provide an output signal always when either a pulse C1, or a pulse C2 occurs. In this manner, the count-up input of counter 107 will receive the sum of pulses C1 and C2 if the tape speed is greater than standard speed.

Due to the Low signal at the input to the AND-gate 123, the countdown signal of the counter 107 will not receive an output from the AND-gate 123.

Figure 4:
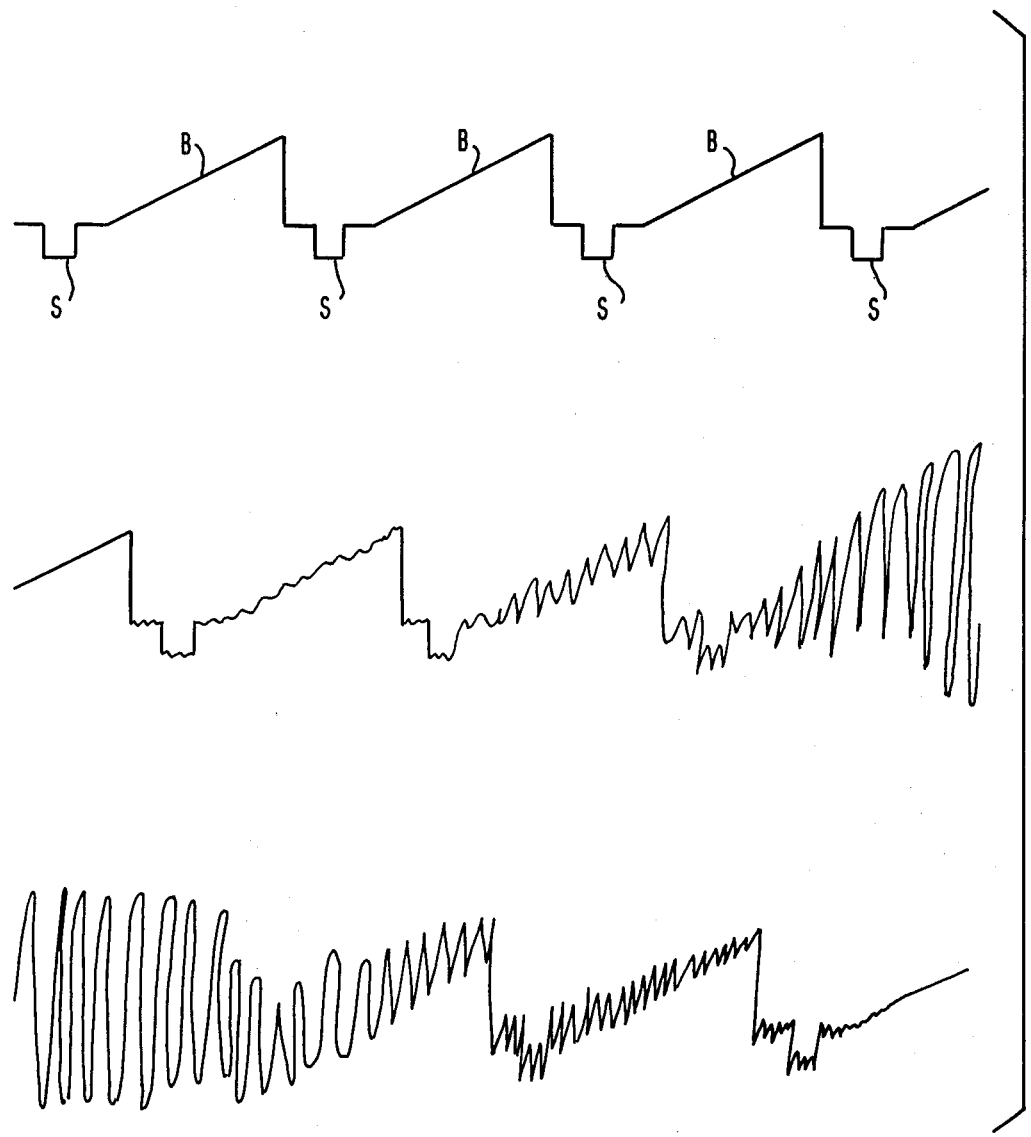
FIG. 4 shows wave shape taken off the tape and representative of cross modulation.

Upon selection of a tape speed less than standard speed, the output of the speed selector switch should provide a High signal at the input A of the logic circuit 106 as agreed. This High signal is inverted in inverter 121 and blocks the AND-gate 122. This High signal is also applied simultaneously to the AND-gate 123 which upon occurrence of pulses C2 at the other input provides these pulses with reverse polarity to the countdown input of the counter 107. The resulting C1 pulses at the input of the OR-gate 124 are applied to the count-up of the counter 107. The counter 107 thus counts upon occurrence of any C1 pulse upwardly and upon occurrence of any C2 pulse downwardly. The counted input pulses are multiplied according to the number of lines in a track, in the example with 52. FIG. 4 makes clear the generation of the cross modulation disturbance upon transition from one track to the next in which cross modulation occurs, the amplitude of which is greater than the greatest signal amplitude which occurs. The upper line shows the undisturbed signal curve with the synchronizing signals S and the video content B. This signal track is carried on in the second line in which, progressing from left toward right, the cross modulation disturbant occurs which, in the third line, decreases to 0.

Figure 5:
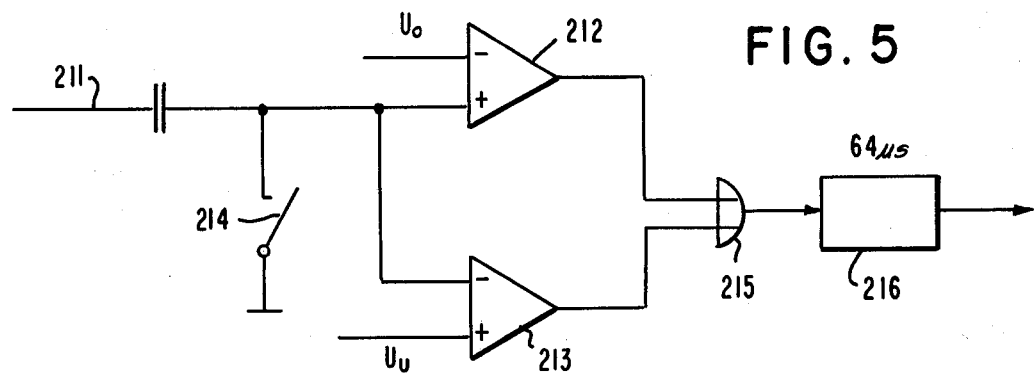
FIG. 5 is a schematic diagram of a detector circuit to recognize cross modulation.

FIG. 5, shows a detector circuit to recognize cross modulation disturbance. The signal taken off the tape and being introduced at 211 is applied to two comparators 212, 213. The signal input 211 is connected to the positive input of the comparator 212 and with the negative input of the comparator 213, after being clamped to a fixed voltage in a clamping stage 214. The negative input of comparator 212 receives a voltage which corresponds to the maximum occurring signal voltage. The positive input of the comparator 213 likewise receives a voltage which corresponds to the smallest occurring signal voltage including the synchronizing signal. At each occurrence of a voltage value at the measuring input of the comparator 212, 213, which is greater than the maximum signal voltage or less than the minimum signal voltage, an output signal is applied to the OR-gate 215. A retriggerable monostable flip-flop and having a time constant of about 64 microseconds is connected to the output of OR-gate 215. The output of the monostable flip-flop 216 thus will have appear thereon only the cross modulation (moiree) disturbances which persist for a longer period than about 1 line. In a practically constructed moiree recognition circuit, comparators 212, 213 have the designation MC 1650 (Motorola) or SN 72510 (Texas Instruments).

Figure 8:
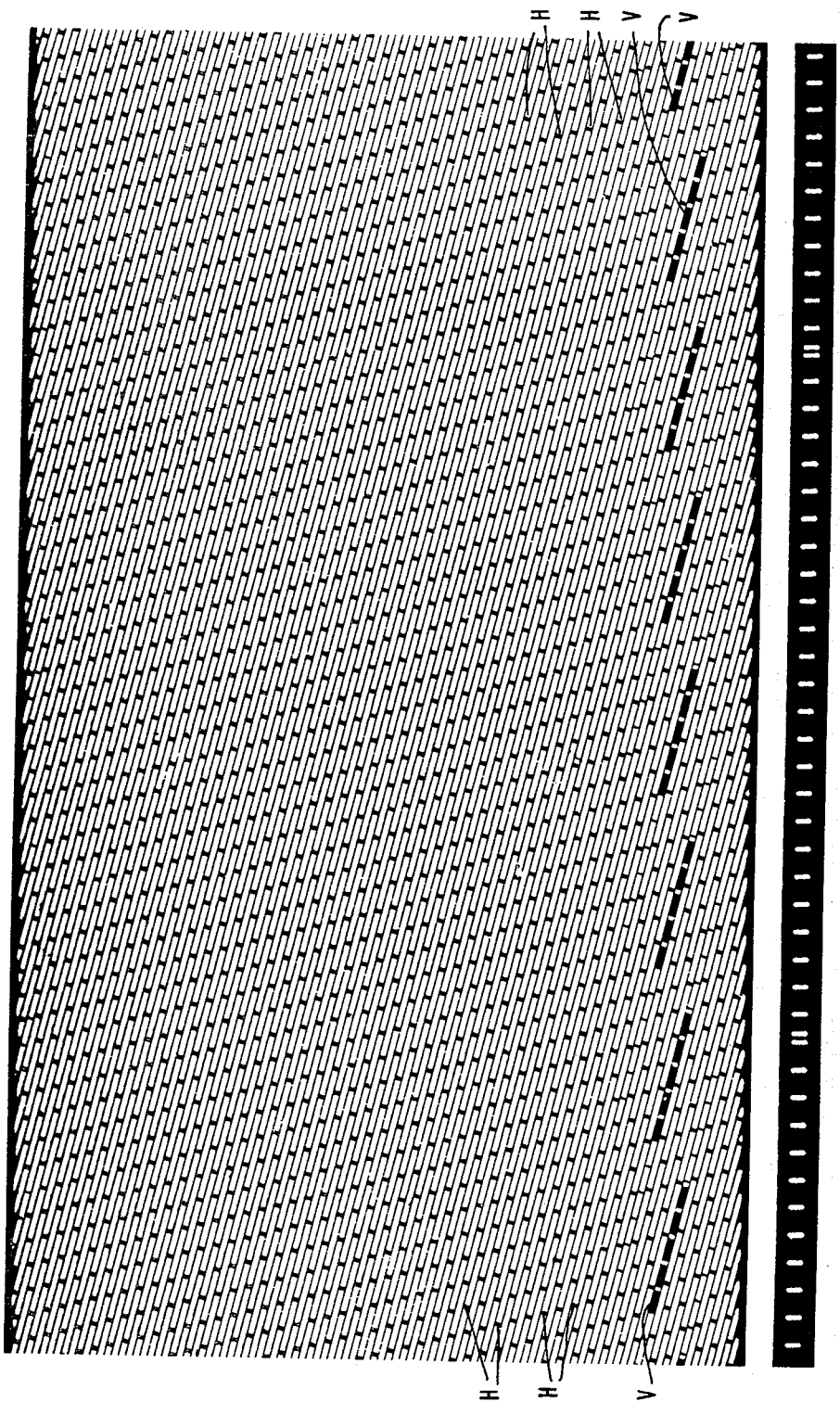
FIG. 8 shows the arrangement of video tracks on a tape, to a greatly enlarged scale.

As already mentioned, the phase jump of one track of sequential horizontal synchronizing signals can be used upon transition from one track to the next track instead of the occurrence of the cross modulation disturbance. In one predetermined arrangement of video tracks on the magnetic tape, the H pulses of a track are offset with respect to the adjacent track. Such a track image is shown in FIG. 8. This is a photographic enlargement and shows the horizontal and vertical synchronizing pulses indicated by the letters H and V.

Figure 6:
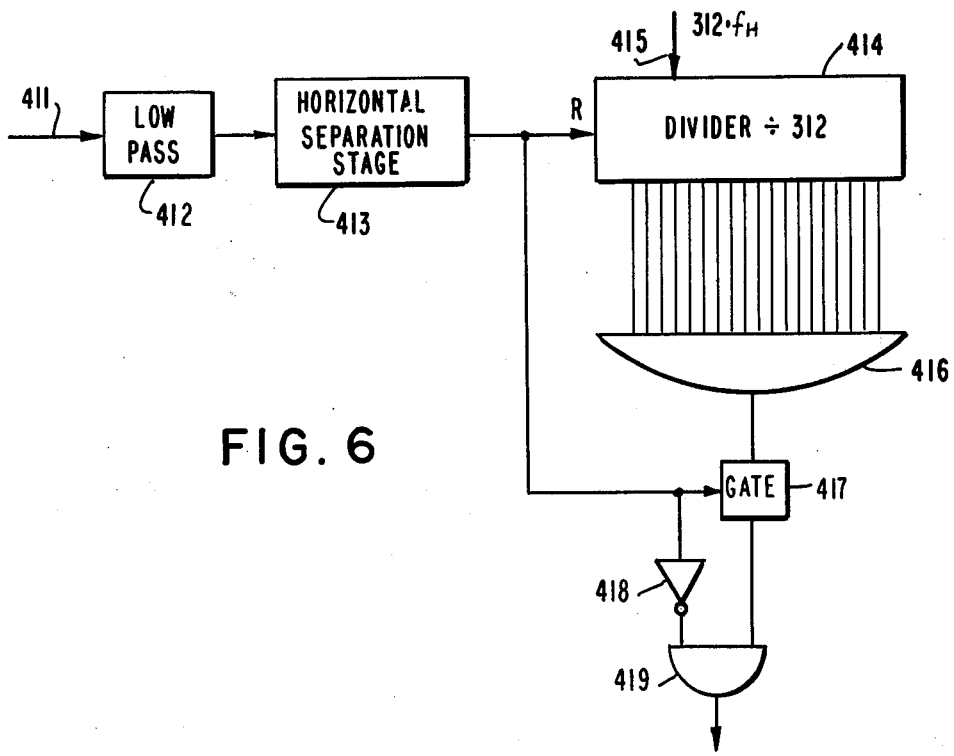
FIG. 6 is a schematic diagram of a detector circuit to recognize phase jump.
Figure 7:
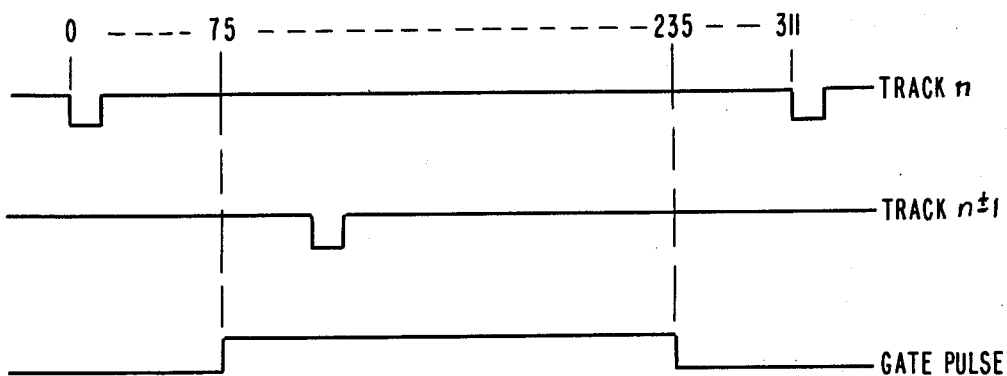
FIG. 7 is a diagram illustrative of horizontal synchronizing pulses, the phase jump of which is to be detected.

FIG. 6 shows such a detector circuit to recognize phase jumps. The signal derived from the tape and appearing at input 411 passes through a low pass and then to a horizontal synchronizing separation stage 413. The separated synchronizing signals are applied to a counter 414 which has applied to the input 415 clock pulses of a frequency of 313 times horizontal frequency. The separated horizontal synchronizing signals which are separated in this separating stage 413 are applied to the reset input R. The signals at the output of the counter are combined in an adder stage 416 and applied to the input of a gate circuit 417. The gate circuit is clocked with the horizontal frequency H and is open only in a central line range. The separated horizontal synchronizing signals are further applied to an inverter 418, the output of which is connected to an input of a transfer circuit formed by AND-gate 419, while the other input of the AND-gate 419 is connected to the output of the gate 417. Upon occurrence of a horizontal synchronizing pulse within the time in which the gate circuit passes pulses (see the pulse diagram in the lower portion of the FIG. 7) the output of the AND-gate 419 will have a pulse as characterist for the occurrence of a track change.

We claim:

1. Method to reproduce video signals stored on magnetic tape in form of track portions which are inclined with respect to the center line of the tape (10) and utilizing a reproduction apparatus in which the tape is guided in a spiral path about at least a portion of the circumference of the cylinder in which a head wheel, having at least one transducer head, is rotatably mounted, for magnetic signal transducing engagement with the tape, and in which the speed of the tape, with respect to the head wheel, differs from the speed of the tape during recording;

and wherein at least three track portions form a complete video frame;

comprising, in accordance with the invention, the steps of rotating the head wheel at a predetermined, essentially constant speed, regardless of the tape speed over the cylinder;

determining the instantaneous position of the head wheel and deriving head wheel position signals defining addresses of said head wheel position as the head wheel rotates;

determining the instantaneous position of incremental areas of the tape on the cylinder, and deriving tape position signals defining addresses of said tape position as the tape moves over the cylinder;

combining said head wheel position address and said tape position address and deriving a line address of a signal transduced by said head wheel from said incremental area;

and, by means of said line address, associating the signal content of incremental areas in any one line and storing said signal content in a memory for subsequent reading out of the signal information from said memory at said line addresses.

2. Method according to claim 1, wherein the step of deriving the line address comprises applying a horizontal sychronization signal to a line counter (101) whereby said counter will count the horizontal synchronization signals and provide continuously line addresses and a frame signal upon having counted the lines of a frame;

phase synchronizing the counter in accordance with the head wheel position signal corresponding to a predetermined position of the head wheel and controlling said counter to then commence counting;

resetting the counter (101) after the counter has counted to a number of horizontal synchronization signals corresponding to a track portion;

algebraically adding to the output of the counter (101) a pulse train derived upon transition from one track to another track and deriving a modified count signal;

applying said modified count signal to a bidirectional counter (107) capable of counting to a number n which is defined as the number of track portions corresponding to at least one field of a television image;

synchronizing said bidirectional counter (107) by synchronizing pulses derived from the tape;

code-converting the output of said bidirectional counter (107) and adding the code-converted output and the line synchronization signals derived from the line counter (101).

3. Method according to claim 2, further including the step of analyzing the signal derived from the head wheel with respect to cross modulation;

sensing when the cross modulation level exceeds a dynamic limit with respect to the: video image signal; and utilizing said transition signal to form said pulse train being added in said algebraic addition step.

4. Method according to claim 2, including the step of recognizing the transition from one track to another track by analyzing the phase position of sequential pulses of the horizontal synchronization signal and sensing a phase jump or sudden change in phase to thereby characterize said transition; and providing a pulse train representative of said transition events to form said pulse train in the algebraic addition step.

5. Method according to claim 2 further including the step of analyzing the signal derived from the head wheel with respect to cross modulation;

sensing when the cross modulation level exceeds a dynamic limit with respect to the synchronizing signal, and utilizing said transition signal to form said pulse train being added in said algebraic addition step.

6. System to reproduce video signals stored on magnetic tape in the form of track portions inclined with respect to the center line of the tape (10)

having a reproducing apparatus in which the tape is guided in a spiral path about a portion of the circumference of a tape cylinder in which a head wheel having at least one transducer head is rotatably mounted for magnetic signal transducing engagement with the tape, and in which the speed of the tape, with respect to the head wheel, during reproduction differs from the respective speed during the recording;

and wherein at least three track portions form a complete video frame, comprising a line counter (101) having its input connected to a pulse source supplying line synchronization pulses thereto and having a reset input connected for phase synchronization of said line counter;

means (104) providing a head wheel position signal defining an address of a predetermined position of the head wheel, as the head wheel rotates, said head wheel position signal generating means (104) providing said phase synchronization signal to the line counter (101);

a first flip-flop (102) connected to the output of the line counter (101) and having a trigger input connected to the horizontal synchronization signals and triggered by one edge of said horizontal synchronization signals;

a second flip-flop (114) connected to and controlled by the transition signals derived from the head wheel upon transition of the magnetic head of the head wheel from one track to a subsequent track, and having a trigger input (H') connected to the horizontal synchronization signals and triggered by another edge of the horizontal synchronization signals;

a logic stage (106) logically combining the signals from said first flip-flop and said second flip-flop;

a bidirectional counter (107) connected to and controlled to count the logically combined pulses furnished by said logic stage (106);

means (108) controlling the counting of said bidirectional counter;

and adder means (111) receiving the pulses from said bidirectional counter (107) and adding thereto the line count pulses derived from said line counter (101).

7. System according to claim 5, further including at least one pulse-shaping stage (103, 105) connected between the output of a respective flip-flop (102, 114) and the input to the logic stage (106).

8. System according to claim 5, further including a code converter (110) connected between the bidirectional counter (107) and said adder (111).

9. System according to claim 5, wherein the bidirectional counter control means (108) comprises a gate connected to at least selected count outputs of the line counter (101) and to control signals (V; 4 V) derived from the tape (10).

* * * * *